United States Patent
Won et al.

(10) Patent No.: US 6,590,056 B2
(45) Date of Patent: Jul. 8, 2003

(54) INORGANIC-ORGANIC HYBRID POLYMERS COMPOSED OF NANO-PARTICLES ON THE SURFACE USING DENDRIMERS AND MANUFACTURING METHOD THEREOF

(75) Inventors: Jongok Won, Seoul (KR); Yong Soo Kang, Seoul (KR); Bum Suk Jung, Seoul (KR); Jee Won Choun, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/860,531

(22) Filed: May 21, 2001

(65) Prior Publication Data

US 2002/0068795 A1 Jun. 6, 2002

(30) Foreign Application Priority Data

Dec. 4, 2000 (KR) ........................................ 2000-72959

(51) Int. Cl.[7] ........................................... C08G 77/452
(52) U.S. Cl. ............................................ 528/25; 26/28
(58) Field of Search ............................... 528/26, 28, 25

(56) References Cited

U.S. PATENT DOCUMENTS

2002/0045714 A1 * 4/2002 Tomalia et al. ............. 525/419

OTHER PUBLICATIONS

"Nanoparticle Formation within Dendrimer–Containing POlymer Networks: Route to New Organic–Inorganic Hybrid Materials" Amis et al. Macromolecules 2001, 34, 2179–2185.*

* cited by examiner

Primary Examiner—Robert Dawson
Assistant Examiner—Marc S Zimmer
(74) Attorney, Agent, or Firm—Rosenberg, Klein & Lee

(57) ABSTRACT

Disclosed is an inorganic-organic hybrid polymer composed of nano-particles on the surface using a dendrimer and a manufacturing method thereof, in which nanometer-sized inorganic (metal) particles are uniformly dispersed across the surface of the polymer and available as optically, electrically and magnetically functional materials. The method includes the steps of: forming a functional anhydride group on a polymer-based matrix; selectively adding metal or inorganic salts to the dendrimer to prepare either of dendrimer-metal precursor solution or dendrimer-inorganic particle solution; inducing the reaction between the functional anhydride group of the surface of polymer matrix with the solution to form a chemical bond between the matrix and the dendrimer; and reducing the metal ions or inorganic particle by irradiation of light.

7 Claims, 5 Drawing Sheets

INORGANIC-ORGANIC HYBRID POLYMERS COMPOSED OF NANO-PARTICLES ON THE SURFACE USING DENDRIMERS AND MANUFACTURING METHOD THEREOF

BACKGROUND OF THE INVENTION

1. Field of the Invention

The present invention relates to an inorganic-organic hybrid polymer composed of nano-particles on the surface using dendrimers and a manufacturing method thereof. More particularly, the invention directs itself to an inorganic-organic hybrid polymer composed of nano-particles on the surface using dendrimers and a manufacturing method thereof, in which nanometer-sized inorganic (metal) particles are uniformly dispersed across the surface of the polymer and available as optically, electrically and magnetically functional materials.

2. Description of the Related Art

In general, nanometer-sized metal or semiconductor particles; i.e., nano-particles having a nonlinear optical effect, and composite materials composed of the nano-particles dispersed on a polymers or a glass matrix, have attracted people's attentions in optically functional materials.

Moreover, nano-particles having a magnetic property are applicable in various ways, for example, electromagnetism storage media. One method for manufacturing the composite materials involves applying a monolayer of the nano-particles, produced by vacuum deposition, sputtering, chemical vapor deposition (CVD) and sol-gel process, on a suitable support film.

For example, a method for manufacturing a self-assembly monolayer is well known in which 3-mercaptopropyl trimethoxysilane or 3-aminopropyl trimethyoxysilane is adhered to the surface of a glass substrate with silane ($SiH_4$) and impregnated into a solution containing nano-particles (Ref. Doron A., Katz E., Willner I. Langmuir, 1995, 11, 1313; Graber K. C., Freeman R., Hommer M. B., Natan M. J., Anal. Chem. 1995, 67, 735; and Freeman R. G., Grabar K. C., Allison K. J., Bright R. M., Davis J. A., Guthrie A. P., Hommer M. B., Jackson M. A., Smith P. C., Walter D. G., Natan M. J., Science, 1995, 267, 1629).

A conventional nano-particle-dispersed matrix system has unsatisfactory characteristics as a composite material, for example, it causes light scattering when used for nonlinear optics, because the nano-particles are ready to change state due to their high surface energy and form an agglutinate during dispersion in the matrix.

A dendrimer is a nanometer-sized monodisperse polymer featuring a tree-like or generational structure that is prepared a from at least one monomer having branching points therein. Known is a method for chemically adhering dendrimers on the surface of polymers using the functional terminal groups (Ref. Korean Patent Appln. No. 10-2000-42435 by WON Jongok, KANG Yong Soo, PARK Yong Soon, CHA Bong-Jun, PARK Hyun-Chae, and Jung Bum-Suk).

Fine particles are different in characteristics from bulk particles due to the finite size effect. For forming the fine particles, many attempts have been tried to produce nanometer-sized metal particles having a zero valence that are stable under various physical and chemical synthesis conditions and susceptible to monodispersion.

Conventional attempts include the techniques of sputtering, metal deposition, abrasion, reduction of metallic salts, and decomposition of organometal precursors.

Transition metal particles, such as gold (Au), silver (Ag), palladium (Pd) and Platinum Pt), manufactured by conventional methods, are in the form of an aggregated powder state or are sensitive to air and tend to be agglomerated irreversibly.

Such an air sensitivity raises a problem in stability when the metal particles present are in a large amount. Moreover, the air sensitivity has another problem that the metal particles are oxidized if the final products are not sealed under a high-priced air blocking state during the manufacturing process.

The irreversible agglomeration raises a separation problem which causes a broad particle size distribution and prevents formation of a smooth and thin film, which is essential for the magnetic recording application field. The agglomeration reduces surface area, which is chemically active for catalytic action, and largely restricts solubility, which is essential for biochemical label, separation and chemical delivery processes.

To control particle size or to manufacture mono-dispersed nano-particles is an important object in a technical application field of the nano-materials. Therefore, control of the nano-particle's sizes and size distribution is the main concern in both physical methods, such as mechanical abrasion, metal deposition condensation, laser ablation and electrical spark corrosion, and of chemical methods such as reduction of metallic salt in a solution state, pyrolysis of metal carbonyl precursor and electrochemical plating of metals.

It is impossible to improve the existing process of direct dispersion of nano-particles into the matrices, since several physical or chemical methods cause imcompatibility and permanent agglomeration. These problems arise during the composite process when metal particles are accumulated from a vapor state under the existence of appropriate stabilizer, or from a transfer fluid or a transfer fluid containing the stabilizer.

Furthermore, even though the metal particles are manufactured in a mono-dispersed state, the particles are agglomerated and not well dispersed due to the heat or pressure generated during the process of dispersing the metal particles in the polymer matrix, especially when the metal particles are not compatible with the polymer matrix and defects are generated on the interface.

SUMMARY OF THE INVENTION

It is, therefore, an object of the present invention to provide inorganic-organic hybrid polymers composed of nano-particles on the surface using dendrimers and a manufacturing method thereof, in which inorganic nano-particles are uniformly dispersed on the surface of the polymer material without a permanent agglomeration.

It is another object of the present invention to provide a simple method for adhering inorganic nano-particles on the surface of polymers with a high adhesive strength using dendrimers.

It is further another object of the present invention to provide a method for easily adjusting the size of inorganic particles and the distance between the nano-particles on the surface of polymers based on the amount of metal precursors or dendrimers.

To achieve the above objects, there is provided a method for manufacturing an inorganic-organic hybrid polymer composed of nano-particles on the surface using dendrimers, the method including the steps of: (a) forming a functional anhydride group on a polymer-based matrix; selectively adding one of metals and inorganic salts to the dendrimers to prepare either a dendrimer-metal precursor solution or a dendrimer-inorganic particle solution; (b) inducing the reaction between the functional anhydride group of the surface of polymer matrix with the solution to form a chemical bond between the matrix and the dendrimer; and (c) reducing the metal ions or inorganic particle by irradiation of light.

The metal precursor is used herein is at least one metallic salt selected from a group consisting of Au, Pt, Pd, Cu, Ag, Co, Fe, Ni, Mn, Sm, Nd, Pr, Gd, Ti, Zr, Si; or an intermetallic compound of elements, binary alloy of elements, ternary alloy of elements, and Fe oxide, barium ferrite or strontium ferrite.

The matrix used in the present invention is a polymer film having anhydride functional groups formed by plasma treating of the polymer films in the existence of maleic anhydride.

The matrix as used herein can be chosen from any polymer film in engineering polymers or specialty polymers, having anhydride groups on the surface formed by plasma treatment.

Examples of the polymer are polypropylene, biaxial orientation polypropylene, low-density polyethylene, high-density polyethylene, polystyrene, polymethyl methacrylate, polyamide 6, polyethylene terephthalate, poly-4-methyl-1-pentene, polybutylene, polypentadiene, polyvinyl chloride, polycarbonate, polybutylene terephthalate, polydimethylsiloxane, polysulfone, polyimide, cellulose, cellulose acetate, ethylene-propylene copolymer, ethylene-butene-propylene terpolymer, polyoxazoline, polyethylene oxide, polypropylene oxide, polyvinylpyrrolidone, and derivatives thereof.

A general mechanism of the present invention is illustrated in the drawings of FIGS. 1a to 1f.

Anhydride functional groups has been introduced on the polymer surface by plasma treatment when the polymer film and maleic anhydride were located in the plasma reactor, (step 1; see FIG. 1a, product 1).

An appropriate amount of metal or inorganic salt is added to a dendrimer-containing solution to prepare a dendrimer-metal precursor solution (step 2; see FIG. 1b, product 2) or a dendrimer-inorganic particle solution (step 3; see FIG. 1c, product 3) by the interaction between the dendrimer and the metal or inorganic salt.

The dendrimer-metallic salt/inorganic particle complex solution is brought in contact with the polymer matrix having the anhydride groups to cause a chemical reaction (steps 4 and 5; see FIGS. 1d and 1e, products 4 and 5, respectively).

Subsequently, the polymer film in which the dendrimer containing the metallic salt is adhered to the surface of the polymer matrix (product 4) is subjected to UV radiation to reduce metallic salt and thereby prepare an inorganic-organic hybrid polymer film with uniformly dispersed nano-particles (step 6; see FIG. 1f, product 6).

The hybrid polymer of the present invention can be used as a component for controlling the phase, strength or frequency of light. This is known as the characteristic of the nanometer-sized metal hybrid polymers having no agglomeration. Such a hybrid polymer can also be used as a data storage medium using the magnetic property of the metal nano-particles.

The hybrid polymer of the present invention also has physical and chemical activities to the subsequent reactions due to the existence of the functional dendritic polymer on the surface.

Furthermore, regulating the property of the matrix allows the use of the hybrid polymer in various applications utilizing the nonlinear optical effect of the metal nano-particles and the characteristics of the matrix (for example, electric conductivity). If the metal nano-particles have catalytic activity, the hybrid polymer may be used as a catalyst of which a catalytic component is supported by a heat-resistant matrix.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Hereinafter, the present invention will be described in the following examples in detail.

EXAMPLE 1

A polydimethylsilicone (PDMS) film, SSPM100™ supplied from Specialty Silicone Product Co., Ltd. was used as a polymer support. The PDMS support, washed with methanol several times, and 102 mg of maleic anhydride from Merch Co., Ltd., were added in a plasma reactor and treated with plasma under vacuum for one minute.

For the plasma device, use was made of an R-300A radio frequency generator (manufactured from Autoelectric Co., Ltd.) set to 13.56 MHz at 50 W.

20 mg of $HAuCL_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the treated PDMS support and kept at 120° C. for one hour to complete the reaction. Immediately after the completion of the reaction, the Au ion-dendrimer complex was subjected to UV irradiation to cause reduction of Au ions.

Figure 1A:
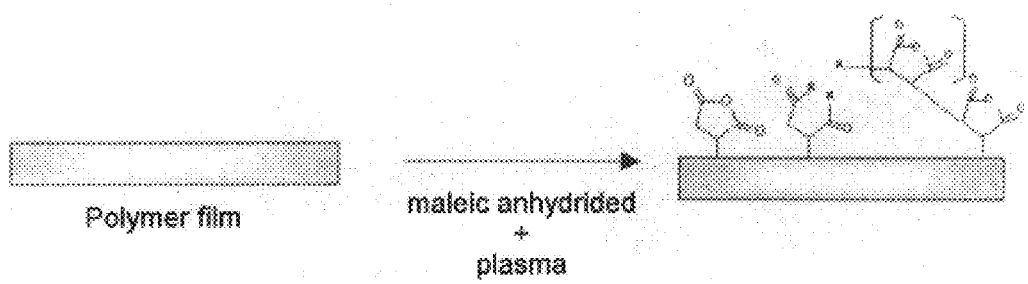
FIGS. 1a to 1f are flow charts roughly showing a manufacturing process according to the present invention.
Figure 1B:
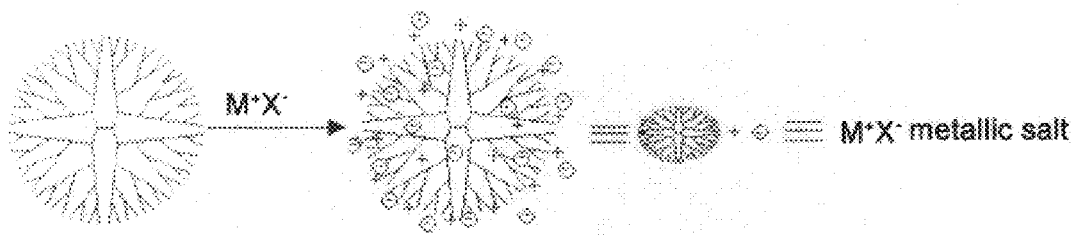
Figure 1C:
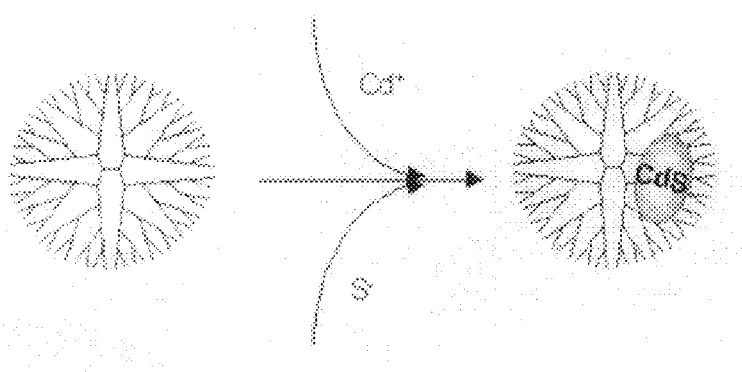
Figure 1D:
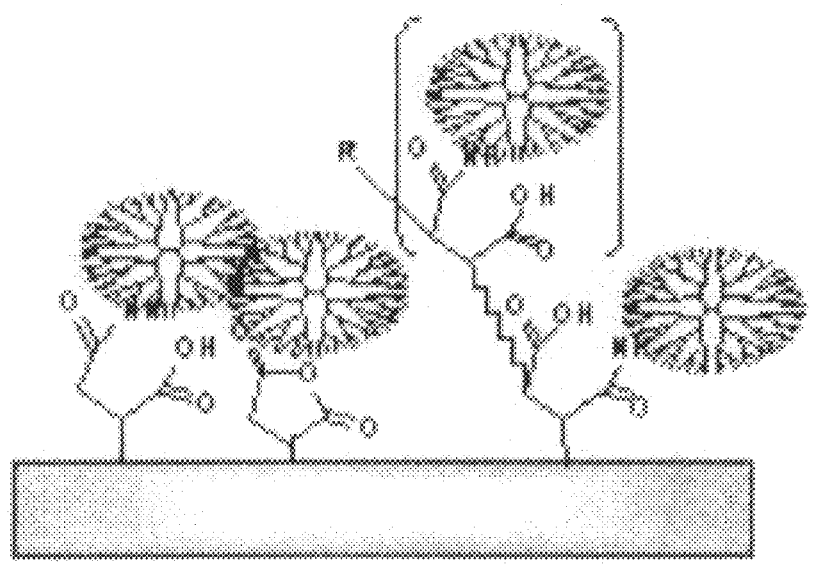
Figure 1E:
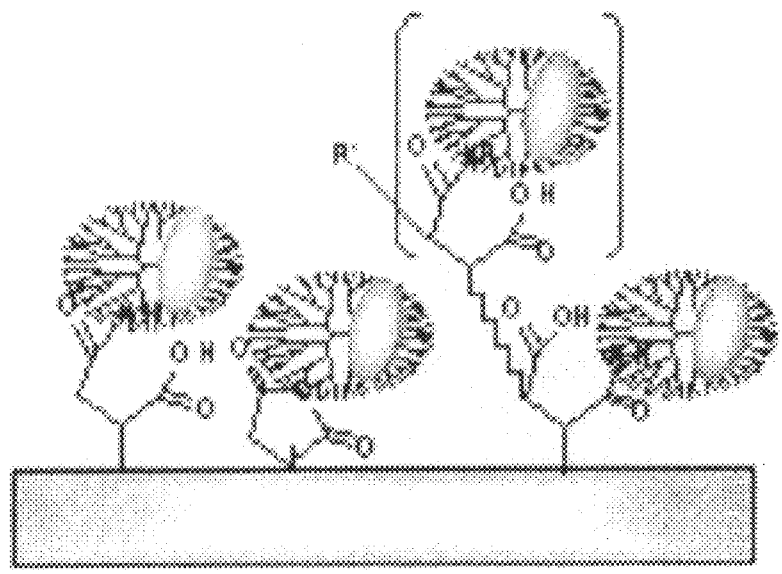
Figure 1F:
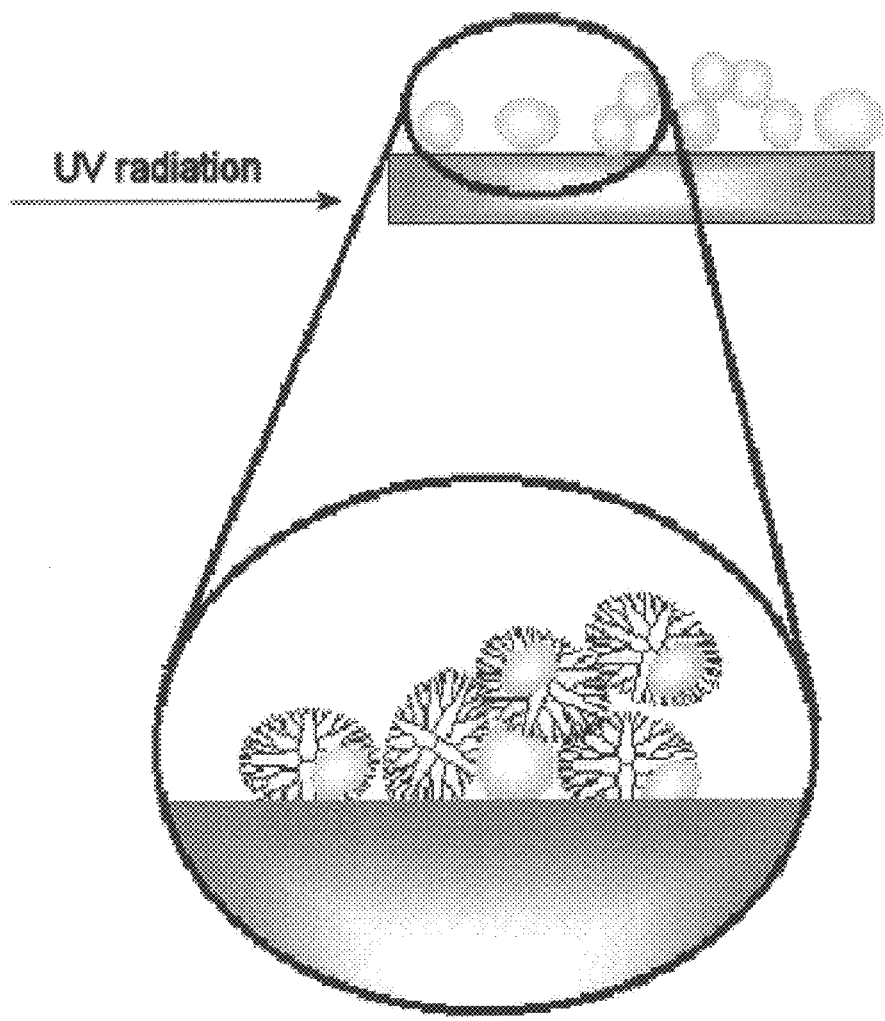
Figure 2:
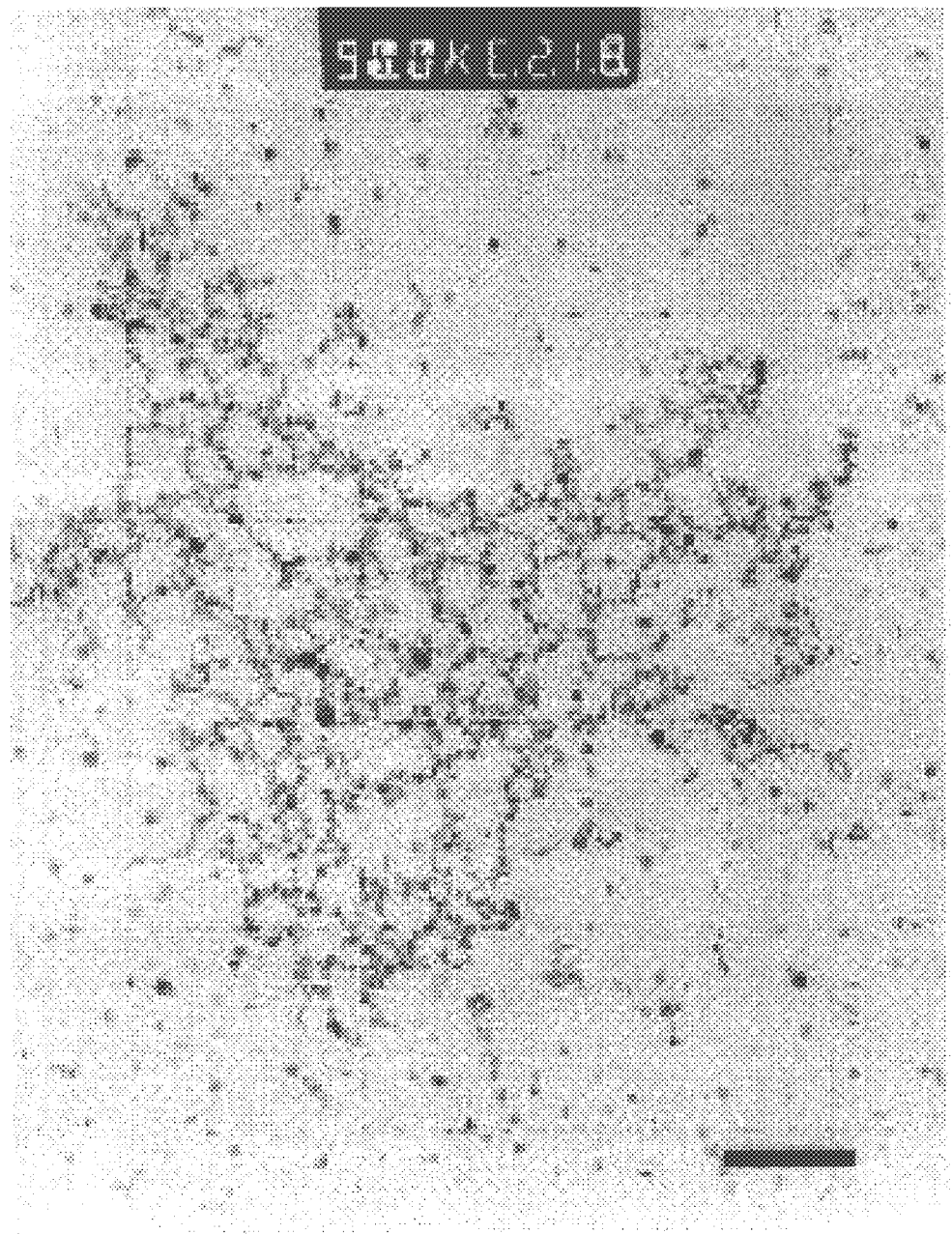
FIG. 2 is a TEM photograph for measuring the size of Au nano-particles obtained under UV irradiation of a metal-dendrimer complex used in Example 1 of the present invention.

The TEM photograph of the Au nano-particles obtained is presented in FIG. 2 (the bar on the right bottom side of the figure is 130 nm in length). The dendrimer or Au ion-dendrimer complex which were not reacted were washed out to obtain an inorganic-organic hybrid polymer film with red-colored Au nano-particles adhered on the almost non-adhesive PDMS film.

EXAMPLE 2

A PDMS film was treated in the presence of maleic anhydride in the same manner as described in Example 1. 40 mg of $HAuCL_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the PDMS support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 3

A PDMS film was treated in the presence of maleic anhydride in the same manner as described in Example 1. 60 mg of $HAuCL_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the PDMS support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 4

A PDMS film was treated with 200 mg of maleic anhydride in the same manner as described in Example 1. 20 mg of $HAuCL_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the PDMS support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film with red-colored Au nano-particles adhered on the almost non-adhesive PDMS film.

EXAMPLE 5

A PDMS film was treated with 200 mg of maleic anhydride in the same manner as described in Example 1. 40 mg of $HAuCL_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the PDMS support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 6

A PDMS film was treated with 500 mg of maleic anhydride in the same manner as described in Example 1. 20 mg of $HAuCL_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the PDMS support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film with red-colored Au nano-particles adhered on the almost non-adhesive PDMS film.

EXAMPLE 7

A PDMS film was treated with 500 mg of maleic anhydride in the same manner as described in Example 1. 40 mg of $HAuCl_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the PDMS support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 8

A polyethyleneterephthalate (PET) film supplied from Yulchon Co., Ltd. was used as a polymer support. The PET support, washed with methanol several times, and 102 mg of maleic anhydride from Merch Co., Ltd. were added in a plasma reactor and treated with plasma under vacuum for one minute. For the plasma device, use was made of an R-300A radio frequency generator (manufactured from Autoelectric Co., Ltd.) set to 13.56 MHz at 50 W.

20 mg of $HAuCl_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the treated PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film with red-colored Au nano-particles adhered on the almost non-adhesive PET film.

EXAMPLE 9

A PET film was treated in the presence of maleic anhydride in the same manner as described in Example 8. 40 mg of $HAuCl_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 10

A PET film was treated in the presence of maleic anhydride in the same manner as described in Example 8. 60 mg of $HAuCl_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 cm$^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 11

A PET film was treated with 201 mg of maleic anhydride in the same manner as described in Example 8. 20 mg of $HAuCl_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 cm$^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film with red-colored Au nano-particles adhered on the almost non-adhesive PET film.

EXAMPLE 12

A PET film was treated with 201 mg of maleic anhydride in the same manner as described in Example 8. 40 mg of $HAuCl_4$ was dissolved in 10 g of water, and 10 mg (20 wt. %) of a third generation dendrimer (polyamideamine Starburst™ supplied from Aldrich Chemical Company Inc.) was added to prepare an Au ion-dendrimer complex. 100 mg of the Au ion-dendrimer complex per 12 cm$^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 13

A PET film was treated with 501 mg of maleic anhydride in the same manner as described in Example 8. 20 mg of $HAuCl_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 cm$^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film with red-colored Au nano-particles adhered on the almost non-adhesive PET film.

EXAMPLE 14

A PET film was treated with 501 mg of maleic anhydride in the same manner as described in Example 8. 40 mg of $HAuCl_4$ was dissolved in 10 g of water, and 10 mg (20 wt. %) of a third generation dendrimer (polyamidoamine Starburst™ supplied from Aldrich Chemical Company Inc.) was added to prepare an Au ion-dendrimer complex. 100 mg of the Au ion-dendrimer complex per 12 cm$^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 15

A PET film was treated in the presence of maleic anhydride in the same manner as described in Example 8. 20 mg of $HAuCl_4$ was dissolved in 10 g of water, and 10 mg (10 wt. %) of a fourth generation dendrimer (polyamidoamine Starburst™ supplied from Aldrich Chemical Company Inc.) was added to prepare an Au ion-dendrimer complex. 100 mg of the Au ion-dendrimer complex per 12 cm$^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 16

A PET film was treated in the presence of maleic anhydride in the same manner as described in Example 8. 20 mg of $HAuCl_4$ was dissolved in 10 g of water, and 45 mg (10 wt. %) of a fourth generation dendrimer (polyamidoamine Starburst™ supplied from Aldrich Chemical Company Inc.) was added to prepare an Au ion-dendrimer complex. 100 mg of the Au ion-dendrimer complex per 12 cm$^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 17

A PET film was treated in the presence of maleic anhydride in the same manner as described in Example 8. 20 mg of $HauCl_4$ was dissolved in 10 g of water, and 90 mg (10 wt. %) of a fourth generation dendrimer (polyamidoamine Starburst™ supplied from Aldrich Chemical Company Inc.) was added to prepare an Au ion-dendrimer complex. 100 mg of the Au ion-dendrimer complex per 12 cm$^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 18

A PET film was treated in the presence of maleic anhydride in the same manner as described in Example 8. 60 mg of $HAuCl_4$ was dissolved in 10 g of water, and 90 mg (10 wt. %) of a fourth generation dendrimer (polyamidoamine Starburst™ supplied from Aldrich Chemical Company Inc.) was added to prepare an Au ion-dendrimer complex. 100 mg of the Au ion-dendrimer complex per 12 $cm^2$ was placed on the PET support and kept at 120° C. for one hour to complete the reaction.

Immediately after the completion of the reaction, the Au ion-dendrimer complex was subjected to UV irradiation to cause reduction of Au ions. The dendrimer or Au ion-dendrimer complex which were not reacted were washed out to obtain an inorganic-organic hybrid polymer film.

EXAMPLE 19

A PET film was treated in the presence of maleic anhydride in the same manner as described in Example 8. $Cd(NO_3)_2 4H_2O$ (supplied from Baker Corp.) and 15 mg of $Na_2S$ (supplied from Alfa Products) were independently dissolved in 100 ml of methanol to prepare two 2.0 mM stock solutions. 10 wt. % of a fourth generation dendrimer (polyamidoamine Starburst™ supplied from Aldrich Chemical Company Inc.) was added to prepare a $1.14\times10^4$ M stock solution. Each 10 ml of the 2.0 mM $Cd^{2+}$ solution and the 2.0 mM $S^{2-}$ solution was added to 10 ml of the $1.14\times10^4$ M stock solution to prepare a CdS-dendrimer solution.

100 mg of the CdS-dendrimer per 12 $cm^2$ was placed on the PET support and kept at 120° C. for one hour to complete the reaction. The dendrimer or CdS-dendrimer which were not reacted were washed out to obtain an inorganic-organic hybrid polymer film.

EXAMPLE 20

The procedures were performed to prepare an inorganic-organic hybrid polymer film in the same manner as described in Example 8, excepting that a metallic salt obtained by mixing $HAuCl_4$ and $AgBF_4$ at a mole ratio of 1:1 was used instead of $HAuCl_4$:

EXAMPLE 21

The procedures were performed to prepare an inorganic-organic hybrid polymer film in the same manner as described in Example 8, excepting that a metallic salt obtained by mixing $HAuCl_4$ and $H_2PtCl_4$ at a mole ratio of 1:1 was used instead of $HAuCl_4$.

EXAMPLE 22

The procedures were performed to prepare an inorganic-organic hybrid polymer film in the same manner as described in Example 8, excepting that a $FeCl_2$ metallic salt was used instead of $HAuCl_4$.

EXAMPLE 23

The procedures were performed to prepare an inorganic-organic hybrid polymer film in the same manner as described in Example 8, excepting that a $CoCl_2$ metallic salt was used instead of $HAuCl_4$.

EXAMPLE 24

The procedures were performed in the same manner to prepare a patterned Au-polymer films as described in Example 8, in which a PET film with a dendrimer-metal precursor adhered on the surface is patterned.

Figure 3:
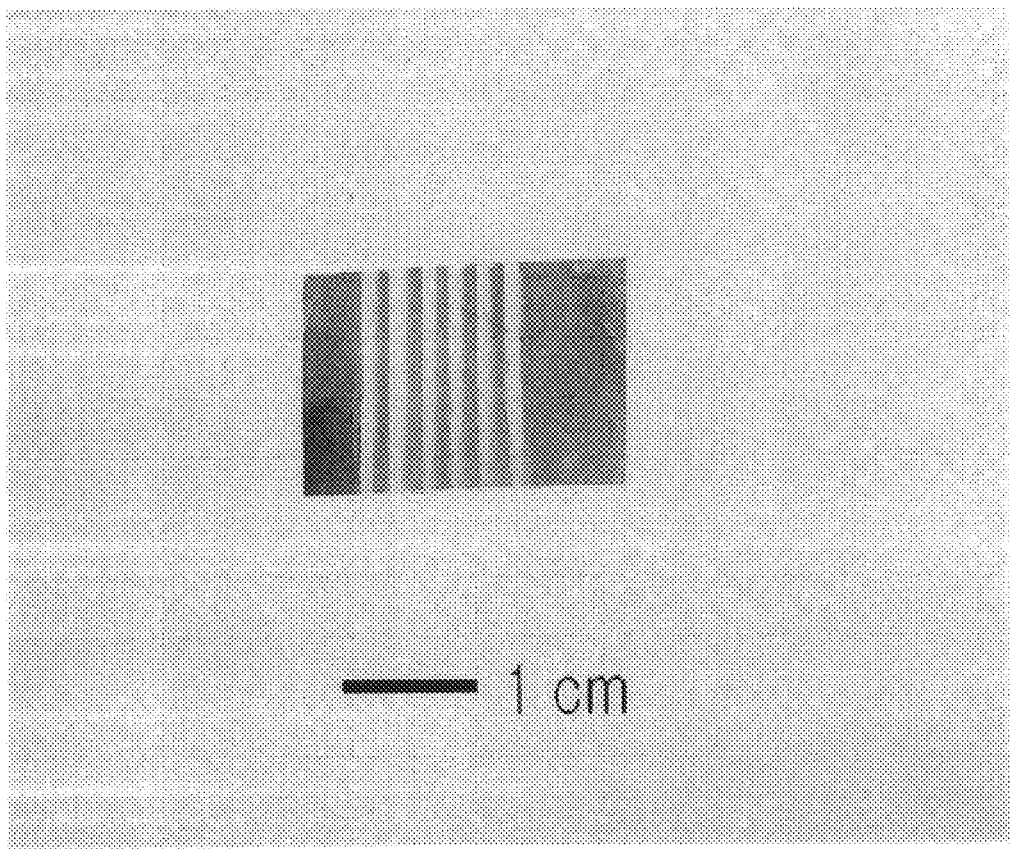
FIG. 3 is a photograph of the film obtained in Example 24 of the present invention.

A photograph of the film thus obtained is shown in FIG. 3, in which a number of straight linear patterns are arranged in parallel on the matrix.

As described above, the present invention involves adhering a metal precursor-dendrimer complex on the surface of a polymer film using a dendrimer that contains many functional terminal groups and forms a complex with metal ions, through a simple plasma method, and irradiation UV rays on the surface of the polymer film to form metal nano-particles on the surface of the polymer film, without permanent agglomeration. This allows for preparation of a metal-organic hybrid polymer film.

The present invention also uses the dendrimer to serve as a container for inorganic nano-particles as well as a stabilizer in the production of metal nano-particles to prepare an inorganic-organic hybrid polymer film composed of the inorganic nano-particles adhered on the surface of the polymer film, without agglomeration.

As such, the present invention can produce an inorganic-organic hybrid polymer film with nano-sized inorganic-metal particles, useful in many applications, being uniformly dispersed without permanent agglomeration, by a simple process including plasma methods and UV irradiation.

According to the present invention, it is possible to prepare a hybrid composite material of which the particle size is controllable without agglomeration using a dendrimer, while overcoming the problems with the conventional methods for manufacturing composite materials. The conventional process is the combination of two separation process; preparation of metal nano-particles and following composite process to disperse nano-particles on the polymer surface, which lead to the agglomeration of nano-particles due to the low adhesive strength between the metal or inorganic nano-particles and the polymer matrix.

While the present invention has been described with reference to the particular illustrative embodiments, it is not to be restricted by the embodiments but only by the appended Claims. It is to be appreciated that those skilled in the art can change or modify the embodiments without departing from the scope and spirit of the present invention.

What is claimed is:

1. A method for manufacturing an inorganic-organic hybrid polymer composed of nano-particles on the surface using dendrimers, the method comprising the steps of:

attaching functional anhydride groups to a polymer-based matrix;

selectively adding metal or inorganic salts to a dendrimer to prepare either a dendrimer-metal precursor solution or a dendrimer-inorganic particle solution;

inducing the reaction between the functional anhydride group of the surface of the polymer matrix with the dendrimer in solution to form a chemical bond between the matrix and the dendrimer; and, reducing the metal ions or inorganic particles by irradiation of light.

2. The method as claimed in claim 1, wherein the functional anhydride group is formed on the matrix by plasma treating the polymer with maleic anhydride.

3. The method as claimed in claim 1, wherein the matrix is at least one selected from the group consisting of polypropylene, biaxial orientation polypropylene, low-density polyethylene, high-density polyethylene, polystyrene, polymethyl methacrylate, polyamide 6, polyethylene terephthalate, poly-4-methyl-1-pentene, polybutylene, polypentadiene, polyvinyl chloride, polycarbonate, polybutylene terephthalate, polydimethylsiloxane, polysulfone, polyimide, cellulose, cellulose acetate, ethylene-propylene copolymer, ethylene-butene-propylene terpolymer, polyoxazoline, polyethylene oxide, polypropylene oxide, polyvinylpyrrolidone, and derivatives thereof.

4. The method as claimed in claim 1, wherein the dendrimer-metal precursor and dendrimer-inorganic particle solutions are prepared by dissolving a salt containing either of metal or inorganic substance in a solvent and adding the dendrimer.

5. The method as claimed in claim 1, wherein the metal precursors are at least one selected from a group consisting of metallic salts of the element Au, Pt, Pd, Cu, Ag, Co, Fe, Ni, Mn, Sm, Nd, Pr, Gd, Ti, Zr, Si, intermetallic compounds of the elements, binary alloys of the elements, ternary alloys of the elements, Fe oxide, barium ferrite, and strontium ferrite.

6. The method as claimed in claim 1, further comprising the step of patterning the surface of the matrix having the functional anhydride group with either of the dendrimer-metal precursor solution or the dendrimer-inorganic particle solution to prepare a patterned film.

7. An inorganic-organic hybrid polymer composed of nano-particles on the surface using a dendrimer, the inorganic-organic hybrid polymer being manufactured by the method as claimed in claim 1.

* * * * *